US012599839B2

(12) United States Patent
Liu

(10) Patent No.: US 12,599,839 B2
(45) Date of Patent: Apr. 14, 2026

(54) DELIVERY OF VIRTUAL EFFECT

(71) Applicant: Tencent Technology (Shenzhen) Company Limited, Shenzhen (CN)

(72) Inventor: Zhihong Liu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 702 days.

(21) Appl. No.: 17/980,462

(22) Filed: Nov. 3, 2022

(65) Prior Publication Data

US 2023/0054065 A1 Feb. 23, 2023

Related U.S. Application Data

(63) Continuation of application No. PCT/CN2021/141624, filed on Dec. 27, 2021.

(30) Foreign Application Priority Data

Jan. 22, 2021 (CN) .......................... 202110090244.3

(51) Int. Cl.
*A63F 13/55* (2014.01)
*A63F 13/426* (2014.01)
*A63F 13/847* (2014.01)

(52) U.S. Cl.
CPC ............ *A63F 13/55* (2014.09); *A63F 13/426* (2014.09); *A63F 13/847* (2014.09)

(58) Field of Classification Search
CPC ...... A63F 13/55; A63F 13/426; A63F 13/847; A63F 13/837; A63F 13/5348; A63F 13/42
See application file for complete search history.

(56) References Cited

U.S. PATENT DOCUMENTS

2010/0245233 A1 9/2010 Hammarling et al.
2015/0231509 A1* 8/2015 McMain, II .......... A63F 13/837
463/31

(Continued)

FOREIGN PATENT DOCUMENTS

CN 108837507 A 11/2018
CN 110064193 A 7/2019
(Continued)

OTHER PUBLICATIONS

Japanese Office Action issued in Application No. 2023-519959, mailed Feb. 13, 2024, with English Translation, 8 pages.
(Continued)

*Primary Examiner* — Thomas H Henry
(74) *Attorney, Agent, or Firm* — ArentFox Schiff LLP

(57) ABSTRACT

A method for delivering a virtual effect is provided. In the method, a target delivery point of the target virtual effect is determined based on a delivery point selection received from a user of a first virtual object. The target virtual effect is configured to change an attribute value of a second virtual object within an effect range of the target virtual effect. An actual delivery point of the target virtual effect is determined based on the target delivery point and one of a plurality of delivery precisions. The one of the plurality of delivery precisions is determined based on a delivery distance between the target delivery point and a position of the first virtual object. Delivery of the target virtual effect in a virtual environment is controlled based on the actual delivery point.

20 Claims, 10 Drawing Sheets

(56)                    References Cited

U.S. PATENT DOCUMENTS

| | | | |
|---|---|---|---|
| 2018/0342103 A1 | 11/2018 | Schwarz et al. | |
| 2022/0054936 A1* | 2/2022 | Salik | A63F 13/52 |

FOREIGN PATENT DOCUMENTS

| | | | |
|---|---|---|---|
| CN | 110721468 | A | 1/2020 |
| CN | 111330268 | A | 6/2020 |
| CN | 112870715 | A | 6/2021 |
| JP | 2006318510 | A | 11/2006 |
| JP | 2006346001 | A | 12/2006 |
| JP | 4832824 | B2 | 12/2011 |

OTHER PUBLICATIONS

International Search Report and Written Opinion issued in International Application No. PCT/CN2021/141624, mailed Mar. 25, 2022, with English Translation, 10 pages.
Chinese Office Action and Search Report issued in Application No. 202110090244.3, mailed Oct. 25, 2022, with Concise English Translation, 10 pages.
Yusufka, What about cluster bombs in Call of Duty Mobile?, 119you.com; https://www.119you.com/smzhsy/yxgl/905684.shtml, Dec. 29, 2020, with English Translation, pp. 1-9.
Notice of holidays, [Call of Duty Mobile Game Guide] Analysis of "Call of Duty Mobile Game" Kill Streak Reward Air-to-Surface Missile, Sohu.com; https://www.sohu.com/a/443912443_120099893, Jan. 11, 2021, with English Translation, pp. 1-12.

* cited by examiner

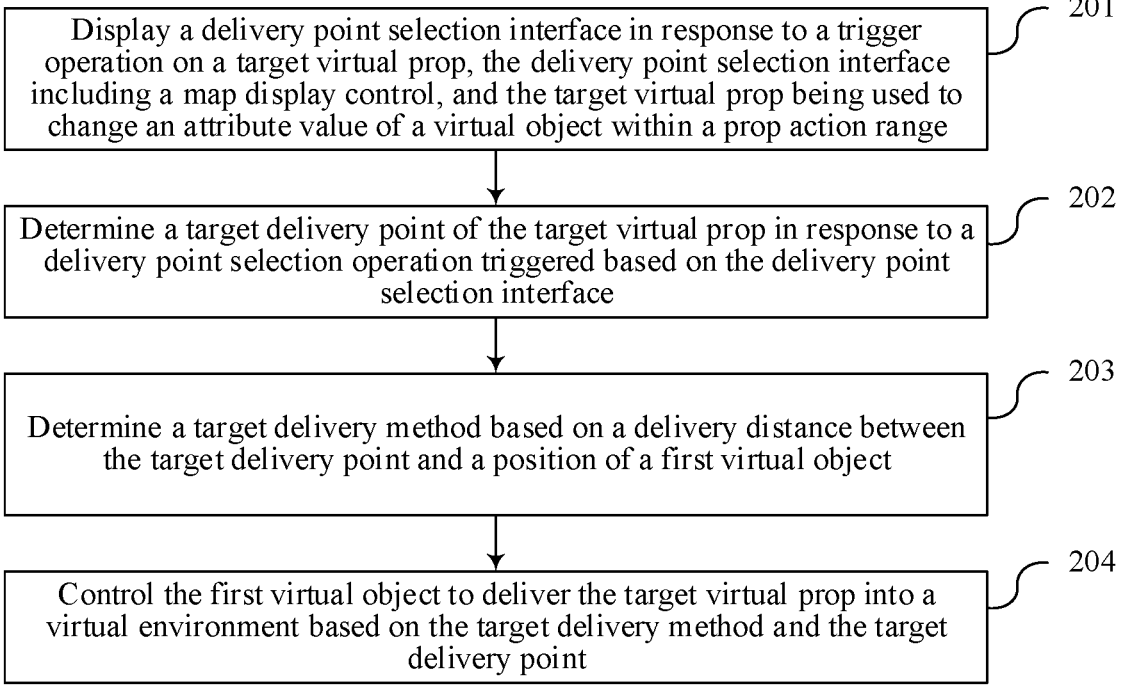

Display a delivery point selection interface in response to a trigger operation on a target virtual prop, the delivery point selection interface including a map display control, and the target virtual prop being used to change an attribute value of a virtual object within a prop action range    201

Determine a target delivery point of the target virtual prop in response to a delivery point selection operation triggered based on the delivery point selection interface    202

Determine a target delivery method based on a delivery distance between the target delivery point and a position of a first virtual object    203

Control the first virtual object to deliver the target virtual prop into a virtual environment based on the target delivery method and the target delivery point    204

FIG. 2

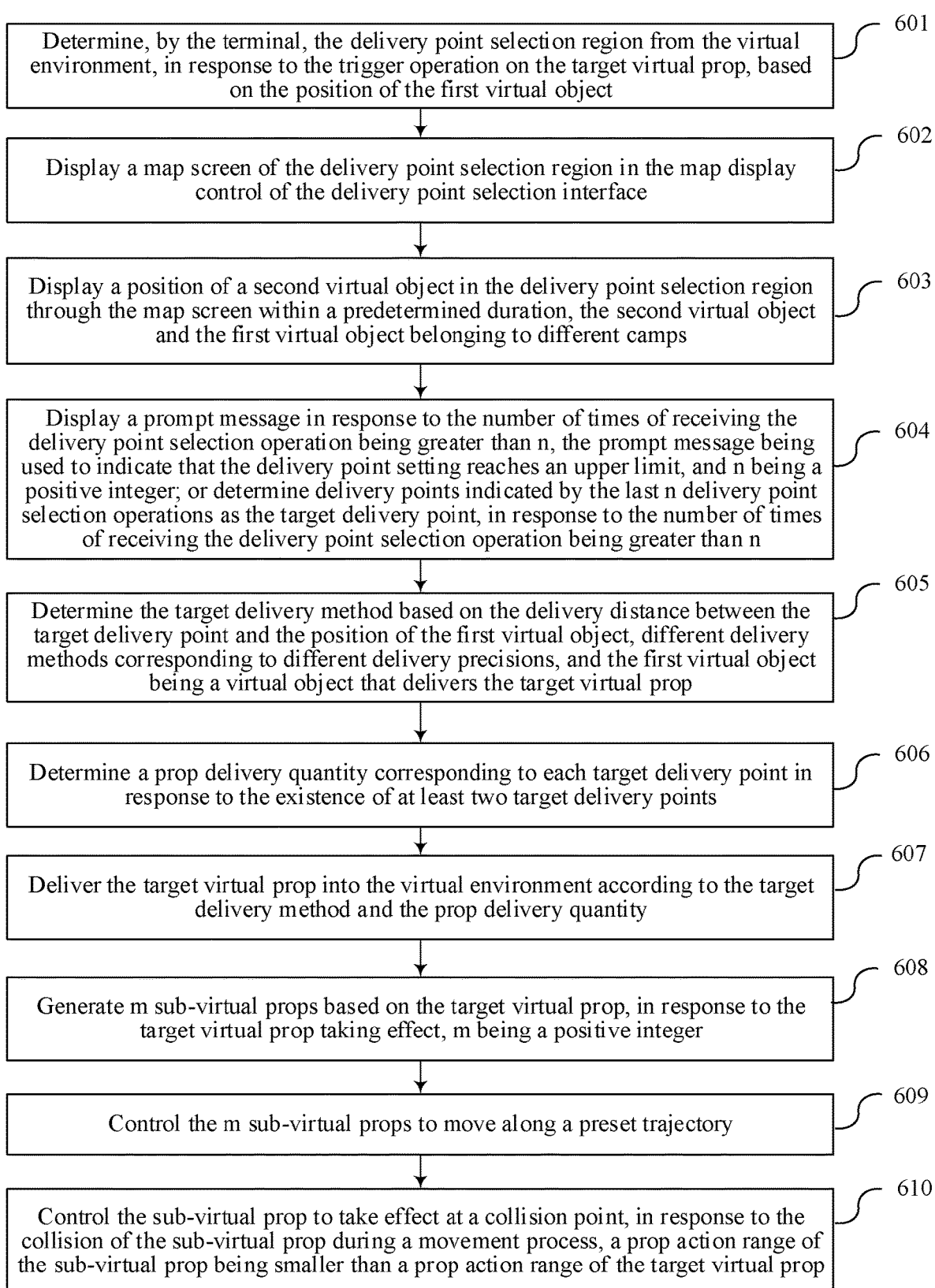

Determine, by the terminal, the delivery point selection region from the virtual environment, in response to the trigger operation on the target virtual prop, based on the position of the first virtual object — 601

Display a map screen of the delivery point selection region in the map display control of the delivery point selection interface — 602

Display a position of a second virtual object in the delivery point selection region through the map screen within a predetermined duration, the second virtual object and the first virtual object belonging to different camps — 603

Display a prompt message in response to the number of times of receiving the delivery point selection operation being greater than n, the prompt message being used to indicate that the delivery point setting reaches an upper limit, and n being a positive integer; or determine delivery points indicated by the last n delivery point selection operations as the target delivery point, in response to the number of times of receiving the delivery point selection operation being greater than n — 604

Determine the target delivery method based on the delivery distance between the target delivery point and the position of the first virtual object, different delivery methods corresponding to different delivery precisions, and the first virtual object being a virtual object that delivers the target virtual prop — 605

Determine a prop delivery quantity corresponding to each target delivery point in response to the existence of at least two target delivery points — 606

Deliver the target virtual prop into the virtual environment according to the target delivery method and the prop delivery quantity — 607

Generate m sub-virtual props based on the target virtual prop, in response to the target virtual prop taking effect, m being a positive integer — 608

Control the m sub-virtual props to move along a preset trajectory — 609

Control the sub-virtual prop to take effect at a collision point, in response to the collision of the sub-virtual prop during a movement process, a prop action range of the sub-virtual prop being smaller than a prop action range of the target virtual prop — 610

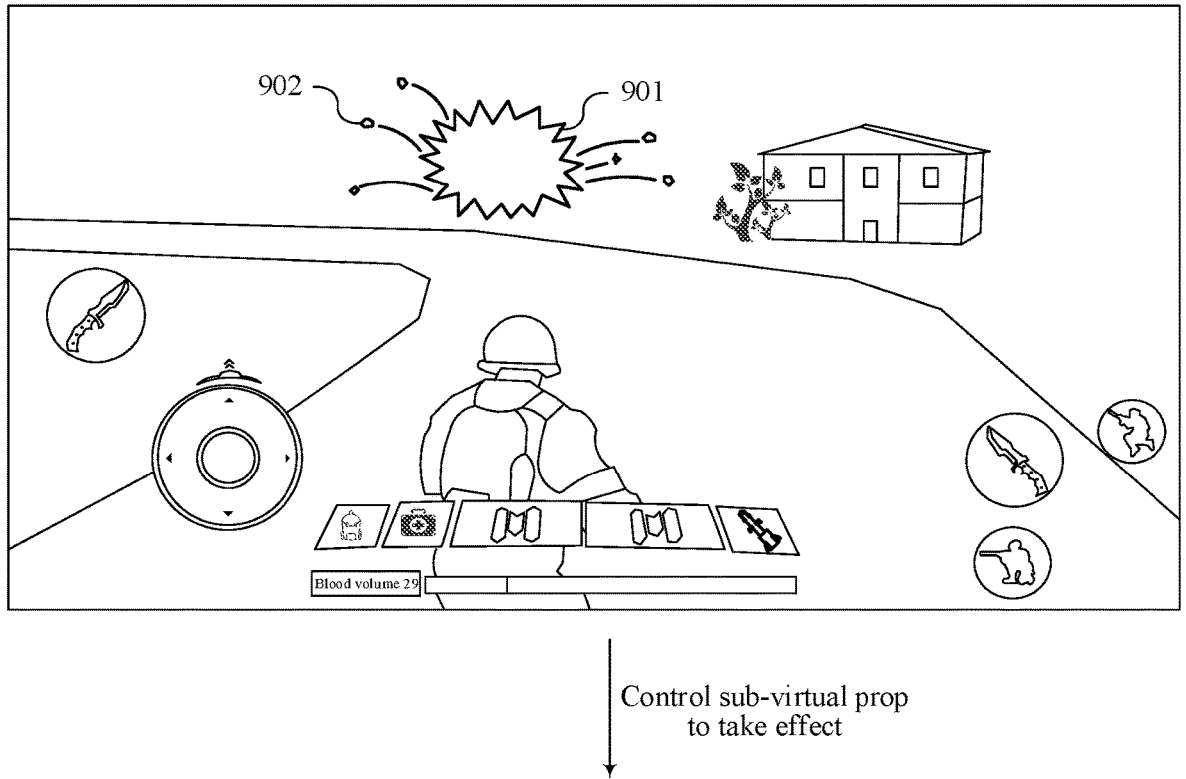
Control sub-virtual prop
to take effect
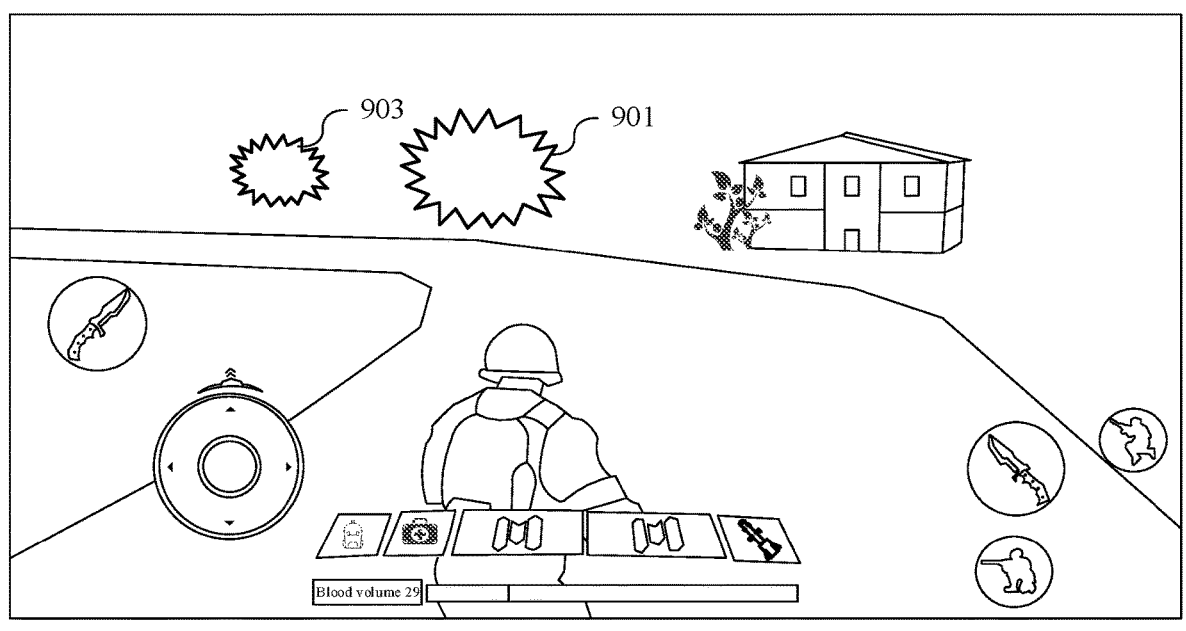
FIG. 9

DELIVERY OF VIRTUAL EFFECT

RELATED APPLICATIONS

The present application is a continuation of International Application No. PCT/CN2021/141624 filed on Dec. 27, 2021, which claims priority to Chinese Patent Application No. 202110090244.3 filed on Jan. 22, 2021. The entire disclosures of the prior applications are hereby incorporated by reference in their entirety.

FIELD OF THE TECHNOLOGY

This application relates to the field of computer technologies, including to a method and an apparatus for delivering a virtual prop, a terminal, a storage medium, and a computer program product.

BACKGROUND OF THE DISCLOSURE

A battle game is a game in which a plurality of user accounts compete in a same scene. A player may control a virtual object in a virtual environment to perform actions such as walking, running, climbing, and shooting, and a plurality of players may team up online to complete a task in the same virtual environment.

In the related art, in order to facilitate the player to control the virtual object to remotely attack an enemy in the distance, a throwing virtual prop with strong attack power, long attack distance, and large attack range is usually provided. The player controls the virtual object to throw a cluster throwing virtual prop to a certain place within the field of view, so that the cluster throwing virtual prop acts on a range selected by the player for several times, which can quickly defeat more players.

However, an action point of the throwing virtual prop in the related art is concentrated on a point within a delivery range selected by the player, and this point is a delivery point randomly determined by a terminal within the delivery range. A single method for delivering a virtual prop makes the number of times of human-computer interactions per unit of time low and the utilization rate of hardware resources of the terminal low.

SUMMARY

Embodiments of this disclosure provide a method and an apparatus for delivering a virtual effect, a terminal, a non-transitory computer-readable storage medium, and a computer program product, which can improve the diversity of the method for delivering a target virtual effect, the number of times of human-computer interactions per unit of time, and the utilization rate of hardware resources of a terminal.

An embodiment of this disclosure provides a method for delivering a virtual effect. In the method, a target delivery point of the target virtual effect is determined based on a delivery point selection received from a user of a first virtual object. The target virtual effect is configured to change an attribute value of a second virtual object within an effect range of the target virtual effect. An actual delivery point of the target virtual effect is determined based on the target delivery point and one of a plurality of delivery precisions. The one of the plurality of delivery precisions is determined based on a delivery distance between the target delivery point and a position of the first virtual object. Delivery of the target virtual effect in a virtual environment is controlled based on the actual delivery point.

An embodiment of this disclosure provides an apparatus including processing circuitry. The processing circuitry is configured to determine a target delivery point of the target virtual effect based on a delivery point selection received from a user of a first virtual object. The target virtual effect is configured to change an attribute value of a second virtual object within an effect range of the target virtual effect. The processing circuitry is configured to determine an actual delivery point of the target virtual effect based on the target delivery point and one of a plurality of delivery precisions, the one of the plurality of delivery precisions being determined based on a delivery distance between the target delivery point and a position of the first virtual object. The processing circuitry is further configured to control delivery of the target virtual effect in a virtual environment based on the actual delivery point An embodiment of this disclosure provides a terminal, including a processor and a memory, the memory storing at least one piece of instruction, at least one program, a code set or an instruction set, the at least one piece of instruction, the at least one program, the code set or the instruction set being loaded and executed by the processor to implement the method for delivering a virtual effect according to the embodiment of this disclosure.

An embodiment of this disclosure provides a non-transitory computer-readable storage medium, storing instructions which when executed by a processor cause the processor to implement the method for delivering a virtual effect according to the embodiment of this disclosure.

An embodiment of this disclosure provides a computer program product or a computer program, the computer program product or the computer program including computer instructions, and the computer instructions being stored in a computer-readable storage medium. A processor of a terminal reads the computer instructions from the computer-readable storage medium, and executes the computer instructions, to cause the terminal to implement the method for delivering a virtual effect according to the embodiment of this disclosure.

Beneficial technical effects of the technical solutions according to the embodiments of this disclosure include the following.

In the embodiment of this disclosure, the target delivery method is determined based on the distance between the target delivery point and the first virtual object. That different delivery distances correspond to different delivery methods causes the method for delivering the target virtual effect or prop to change with a change of the delivery distance. Thus, compared with the single delivery method in the related art, delivery methods with different delivery precisions can be simulated based on the delivery distance, which improves the diversity of the method for delivering the target virtual effect or prop, increases the number of times of delivery of the target virtual effect or prop per unit of time, that is, increases the number of times of human-computer interactions per unit of time, and improves the utilization rate of hardware resources of the terminal.

BRIEF DESCRIPTION OF THE DRAWINGS

FIG. 2 is a schematic flowchart of a method for delivering a virtual prop according to an embodiment of this disclosure.

FIG. 6 is a schematic flowchart of a method for delivering a virtual prop according to an embodiment of this disclosure.

FIG. 9 is a schematic diagram of controlling the sub-virtual prop to take effect according to an embodiment of this disclosure.

DESCRIPTION OF EMBODIMENTS

Figure 1:
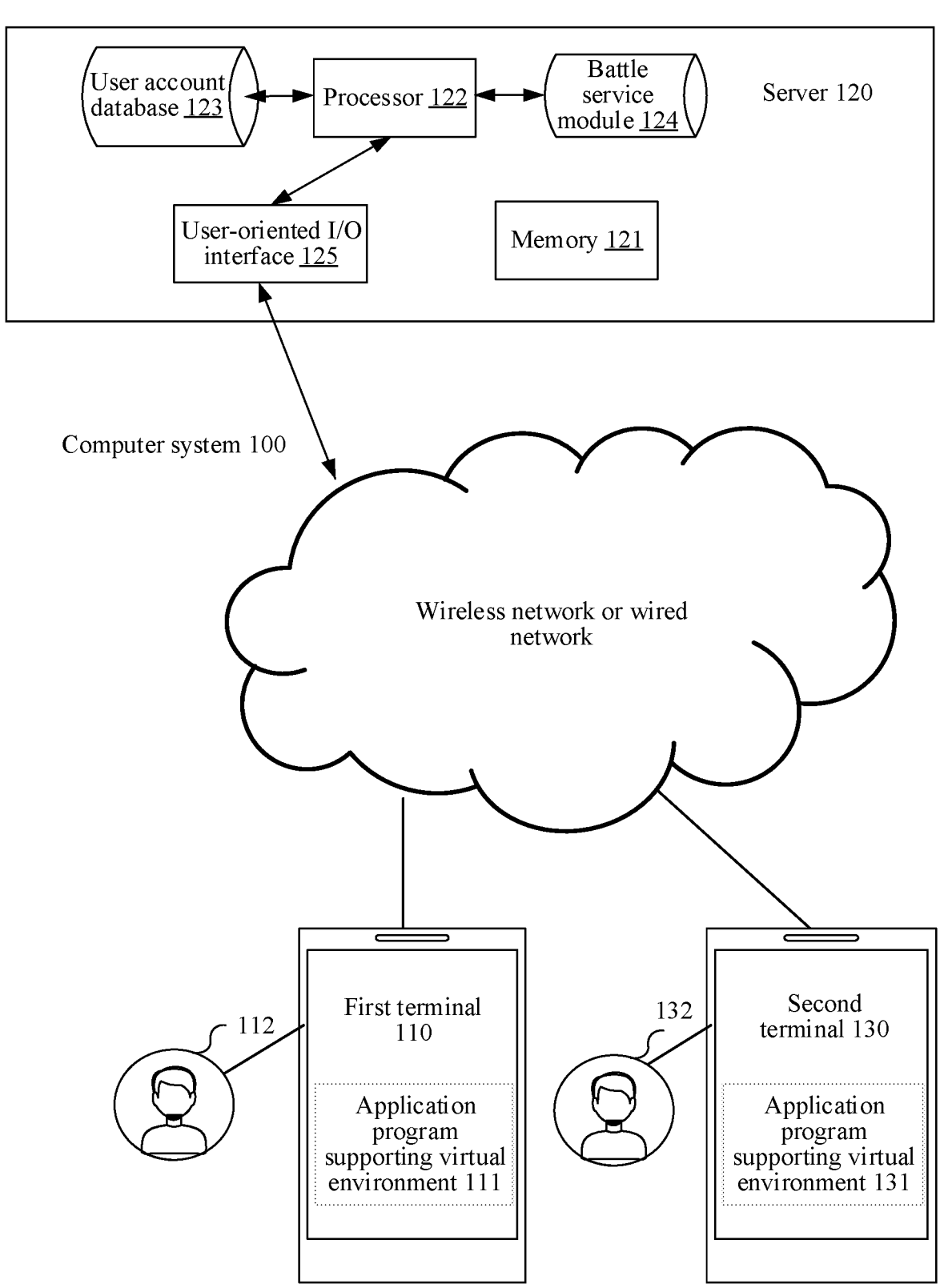
FIG. 1 is a schematic diagram of an implementation environment according to an embodiment of this disclosure.

The technical solutions in embodiments of this disclosure are described below with reference to the accompanying drawings in the embodiments of this disclosure. The described embodiments are merely some rather than all of the embodiments of this disclosure. Other embodiments are within the scope of this disclosure.

In the following description, "some embodiments" describes subsets of all possible embodiments, but it may be understood that "some embodiments" may be the same subset or different subsets of all the possible embodiments, and may be combined with each other without conflict.

In the following descriptions, the involved term "first/second" is merely intended to distinguish similar objects but does not represent a specific order of an object. It may be understood that "first/second" is interchangeable in terms of a specific order or sequence if permitted, so that the embodiments of this disclosure described herein can be implemented in a sequence in addition to the sequence shown or described herein.

"Plurality of" mentioned in the specification means two or more. "And/or" describes an association relationship for describing associated objects and represents that three relationships may exist. For example, A and/or B may represent the following three cases: only A exists, both A and B exist, and only B exists. The character "/" generally represents an "or" relationship between the associated objects.

First, the terms involved in the embodiments of this disclosure are introduced as follows.

1) Virtual Environment

A virtual environment may be displayed (or provided) when an application program runs on a terminal. The virtual environment may be a simulated environment of a real world, or may be a semi-simulated semi-fictional three-dimensional environment, or may be an entirely fictional three-dimensional environment. The virtual environment may be any one of a two-dimensional virtual environment, a 2.5-dimensional virtual environment, and a three-dimensional virtual environment. A description is made using an example in which the virtual environment is a three-dimensional virtual environment in the following embodiments, but this is not limited. In some embodiments, the virtual environment is further used for a virtual environment battle between at least two virtual characters, and there are virtual resources available to the at least two virtual characters in the virtual environment.

2) Virtual Object

A Virtual object is, for example, a movable object in a virtual scene. The movable object may be at least one of a virtual figure, a virtual animal, and an animation and cartoon figure. In some embodiments, in a case that the virtual scene is a three-dimensional virtual scene, the virtual object may be a three-dimensional model. Each virtual object has its own shape and volume in the three-dimensional virtual scene, and occupies some space in the three-dimensional virtual scene. In some embodiments, a virtual character is a three-dimensional character constructed based on a three-dimensional human skeleton technology. The virtual character wears different skins to implement different appearances. In some implementations, the virtual character may be alternatively implemented by using a 2.5-dimensional model or a two-dimensional model, which is not limited in the embodiments of this disclosure.

3) Virtual Prop

A Virtual prop, for example, is a prop that the virtual object can use in the virtual environment, including at least one of a virtual interactive prop for interaction (e.g., a virtual attack prop), a function prop, and virtual equipment. In this disclosure, the virtual prop may refer to a virtual interactive prop, and the virtual interactive prop is used to change an attribute value of the virtual object in the virtual environment. For example, a virtual weapon includes at least one of a shooting virtual prop, a melee attack virtual prop, and a delivering virtual prop. The delivering virtual prop is a virtual prop that is delivered by a virtual object or other virtual vehicle towards a certain direction or place, and takes effect upon reaching a delivery point or after a collision.

4) User Interface (UI) Control

UI control may include any visual control or element that can be seen on a user interface of an application program, such as a picture, an input box, a text box, a button, a label, and other controls, where some UI controls respond to an operation of a user.

The method according to the embodiment of this disclosure may be applied to a virtual reality application program, a three-dimensional map program, a first-person shooting game, a multiplayer online battle arena game (MOBA), and the like. An application during a game is used as an example for description in the following embodiments.

A game based on the virtual environment is often formed by maps of one or more game worlds. The virtual environment in the game simulates scenes of a real world, and the user may manipulate a virtual object in the game to walk, run, jump, shoot, fight, drive, use virtual props in a switching manner, use the virtual prop to damage other virtual objects, and perform other actions in the virtual environment. In order to facilitate a player to control the virtual object to remotely attack an enemy in the distance, the application program usually provides a throwing virtual prop with strong attack power, long attack distance, and large attack range. In the related art, the player controls the virtual object to throw a virtual prop to a certain region, so that a terminal controls the virtual prop to act in a range selected by the player, which can quickly defeat more players. An action point of this virtual prop is concentrated on a point within the delivery range selected by the player, and this point is usually a delivery point randomly determined by the terminal within the delivery range, which makes it easier for the enemy to avoid the virtual prop, resulting in a waste of prop resources.

Based on this, an embodiment of this disclosure provides a method for delivering a virtual prop. The terminal determines a target delivery method based on a delivery distance between a target delivery point selected by the user and a position of a first virtual object, and different delivery methods correspond to different delivery precisions, so that the delivery precision changes with a change of the delivery distance.

FIG. 1 shows a schematic diagram of an implementation environment according to an embodiment of this disclosure. The implementation environment may include: a first terminal 110, a server 120, and a second terminal 130.

An application program 111 supporting a virtual environment is installed and run on the first terminal 110. When the first terminal runs the application program 111, a user interface of the application program 111 is displayed on a screen of the first terminal 110. The application program 111 may be any one of a MOBA game, an escape shooting game, and a simulation game (SLG). In this embodiment, a description is made using an example in which the application program 111 is a role-playing game (RPG). The first terminal 110 is a terminal used by a first user 112. The first user 112 uses the first terminal 110 to control a first virtual object located in the virtual environment to perform activities, and the first virtual object may be referred to as a master virtual object of the first user 112. The activities of the first virtual object include, but are not limited to: at least one of body posture adjustment, crawling, walking, running, riding, flying, jumping, driving, picking-up, shooting, attacking, throwing, and skill release. Exemplarily, the first virtual object is a first virtual figure, such as a simulated figure or an animation and cartoon figure.

An application program 131 supporting a virtual environment is installed and run on a second terminal 130. When the second terminal 130 runs the application program 131, a user interface of the application program 131 is displayed on a screen of the second terminal 130. The application program 131 may be any one of a MOBA game, an escape shooting game, and a SLG game. In this embodiment, a description is made using an example in which the application program 131 is a RPG. The second terminal 130 is a terminal used by a second user 132. The second user 132 uses the second terminal 130 to control a second virtual object located in the virtual environment to perform activities, and the second virtual object may be referred to as a master virtual object of the second user 132. For example, the second virtual object is a second virtual figure, such as a simulated figure or an animation and cartoon figure.

In some embodiments, the first virtual object and the second virtual object are in a same virtual world, and the first virtual object and the second virtual object may belong to a same camp, a same team, or a same organization, have a friend relationship, or have a temporary communication permission. In some embodiments, the first virtual object and the second virtual object may belong to different camps, different teams, or different organizations, or have a hostile relationship with each other. In the embodiment of this disclosure, a description is made using an example in which the first virtual object and the second virtual object belong to a same camp.

In some embodiments, the application programs installed on the first terminal 110 and the second terminal 130 are the same, or the application programs installed on the two terminals are the same type of application programs on different operation system platforms (Android or iOS). The first terminal 110 may generally refer to one of a plurality of terminals, and the second terminal 130 may generally refer to another one of a plurality of terminals. In this embodiment, only the first terminal 110 and the second terminal 130 are used as an example for description. The first terminal 110 and the second terminal 130 are of the same or different device types, and the device type includes at least one of a smart phone, a tablet computer, an e-book reader, a MP3 player, a MP4 player, a laptop, and a desktop computer.

FIG. 1 shows only two terminals. However, a plurality of other terminals may access the server 120 in different embodiments. In some embodiments, there are further one or more terminals corresponding to a developer. A platform for developing and editing the application program supporting the virtual environment is installed on the terminal. The developer may edit and update the application program on the terminal, and transmit an updated application program installation package to the server 120 through a wired or wireless network. The first terminal 110 and the second terminal 130 may download the application program installation package from the server 120 to update the application program.

The first terminal 110, the second terminal 130, and the another terminal are connected to the server 120 through a wireless network or a wired network.

The server 120 includes at least one of one server, a server cluster including a plurality of servers, a cloud computing platform, and a virtualization center. The server 120 is configured to provide a background service for an application program supporting a three-dimensional virtual environment. In some embodiments, the server 120 is responsible for primary computing work, and the terminal is responsible for secondary computing work; or the server 120 is responsible for secondary computing work, and the terminal is responsible for primary computing work; or the server 120 and the terminal perform collaborative computing by using a distributed computing architecture between each other.

In an example, the server 120 includes a memory 121, a processor 122, a user account database 123, a battle service module 124, and a user-oriented input/output (I/O) interface 125. The processor 122 is configured to load instructions stored in the server 120, and process data in the user account database 123 and the battle service module 124. The user account database 123 is configured to store data of user accounts used by the first terminal 110, the second terminal 130, and the another terminal, for example, avatars of the user accounts, nicknames of the user accounts, battle effectiveness indexes of the user accounts, and service zones of the user accounts. The battle service module 124 is configured to provide a plurality of battle rooms for the users to battle, for example, a 1v1 battle room, a 3v3 battle room, a 5v5 battle room, and the like. The user-oriented I/O interface 125 is configured to establish communication with at least one of the first terminal 110 and the second terminal 130 for data exchange by using a wireless network or a wired network.

FIG. 2 shows a flowchart of a method for delivering a virtual prop according to an embodiment of this disclosure. In this embodiment, a description is made using an example in which the method is used for the first terminal 110 or the second terminal 130 in the implementation environment shown in FIG. 1 or other terminals in the implementation environment, and the method includes the following steps.

Step 201: Display, by a terminal, a delivery point selection interface in response to a trigger operation on a target virtual prop, the target virtual prop being used to change an attribute value of a virtual object within a prop action range. In an example, a delivery point selection interface is displayed in response to a user selection of a target virtual effect. The target virtual effect is configured to change an attribute value of a second virtual object within an effect range of the target virtual effect.

In an example, the target virtual prop is a virtual prop used to change the attribute value of the virtual object within the prop action range, and the target virtual prop belongs to a delivering virtual prop. The target virtual prop may be directly delivered by the virtual object, or may be delivered by other virtual vehicles configured to carry the virtual object, and the user controls a first virtual object by the terminal to use the target virtual prop. In some embodiments, when the trigger operation on the target virtual prop is received, the terminal displays the delivery point selection interface, so that the user selects a target delivery point of the target virtual prop from the delivery point selection interface. The method of the exemplary embodiment of this disclosure is applied in a virtual environment. In some embodiments, the delivery point selection interface includes a map display control, and the map display control is configured to display a map screen corresponding to the virtual environment.

In some embodiments, the trigger operation on the target virtual prop includes a click operation on a UI control, a touch operation such as a long-press operation or a drag and drop operation, or a voice control operation, which is not limited in the embodiment of this disclosure.

In some embodiments, when the trigger operation on the target virtual prop is received, the terminal switches from a virtual environment interface to the delivery point selection interface, or the terminal displays the delivery point selection interface on the virtual environment interface in a superimposing manner.

Figure 3:
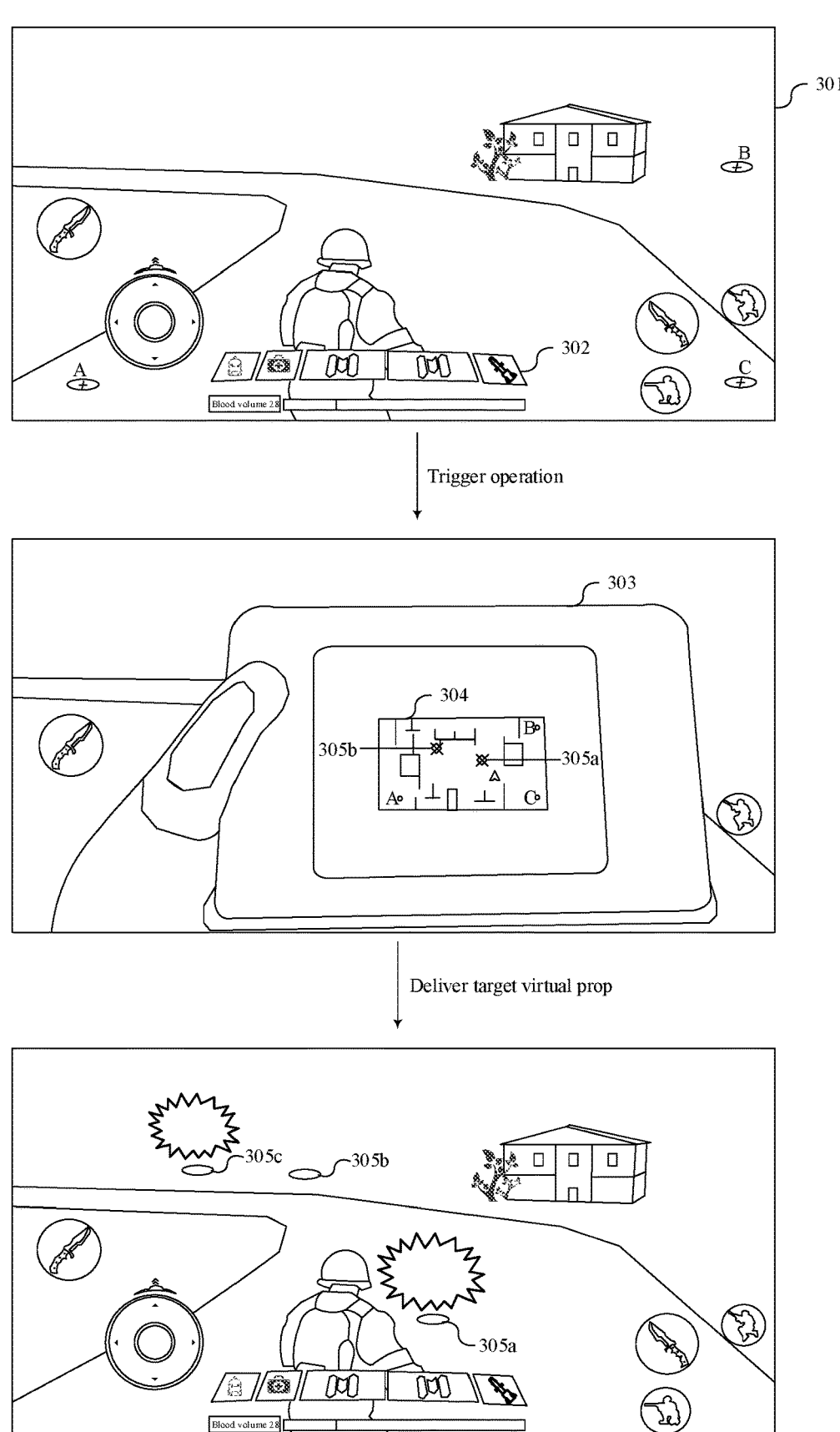
FIG. 3 is a schematic diagram of delivering a target virtual prop according to an embodiment of this disclosure.

As shown in FIG. 3, a virtual environment interface 301 displays a target virtual prop control 302 corresponding to the target virtual prop. When the terminal receives a trigger operation on the target virtual prop control 302, the terminal displays a delivery point selection interface 303. The delivery point selection interface 303 includes a map display control 304.

Step 202: Determine a target delivery point of the target virtual prop in response to a delivery point selection operation triggered based on the delivery point selection interface. In an example, a target delivery point of the target virtual effect is determined based on a delivery point selection received from a user of a first virtual object. In an example, the target delivery point of the target virtual effect is determined based on the delivery point selection received from the user of the first virtual object via the delivery point selection interface.

In some embodiments, the user may select the target delivery point of the target virtual prop through the map display control in the delivery point selection interface. For example, the delivery point selection operation is a click operation acting on the map display control. After the terminal receives the click operation on the map display control, the terminal determines the target delivery point in the virtual environment based on a touch point of the click operation and a mapping relationship between the map screen in the map display control and the virtual environment. For example, the terminal displays the map screen corresponding to the virtual environment through the map display control at a scale of 1:1000. When the terminal receives a delivery point selection operation acting on a position located 1 cm directly in front of the first virtual object in the map display control, the terminal determines a point located 10 m directly in front of the first virtual object in the virtual environment as the target delivery point.

As shown in FIG. 3, the terminal displays a target delivery point 305a and a target delivery point 305b in the map display control based on the delivery point selection operation, so as to prompt the user of a position of the target delivery point selected currently.

In some embodiments, the terminal uses a reference point in the virtual environment to determine a position of the target delivery point in the virtual environment. For example, as shown in FIG. 3, the terminal selects three points A, B and C as reference points from the virtual environment, and determines positions of the reference point A, the reference point B and the reference point C in the map screen displayed by the map display control. When receiving the delivery point selection operation, the terminal determines a specific position of the target delivery point in the virtual environment based on a relative relationship between a touch position of the delivery point selection operation and a display position of each reference point on the map screen, and the positions of the three reference points in the virtual environment. During an actual operation process, the terminal does not display the position of the reference point on the virtual environment screen and the map display control, so as not to interfere with the operation of the user.

Step 203: Determine a target delivery method based on a delivery distance between the target delivery point and a position of a first virtual object. In an example, an actual delivery point of the target virtual effect is determined based on the target delivery point and one of a plurality of delivery precisions. The one of the plurality of delivery precisions is determined based on a delivery distance between the target delivery point and a position of the first virtual object.

In some embodiments, different delivery distances correspond to different delivery methods, for example, different delivery methods correspond to different delivery precisions, and the first virtual object is a virtual object that delivers the target virtual prop.

The delivery distance refers to a distance between the target delivery point and the position of the first virtual object in the virtual environment. In the embodiment of this disclosure, the terminal determines a method for delivering the target virtual prop based on the delivery distance. For example, when the delivery distance is less than a preset distance, the terminal determines a delivery method with a high delivery precision as the target delivery method, and when the delivery distance is greater than the preset distance, the terminal determines a delivery method with a low delivery precision as the target delivery method.

In some embodiments, the terminal determines the target delivery method according to a correspondence between the delivery distance and the delivery method.

Step 204: Control the first virtual object to deliver the target virtual prop into a virtual environment based on the target delivery method and the target delivery point. In an example, delivery of the target virtual effect in a virtual environment is controlled based on the actual delivery point.

When the terminal receives a delivery operation, the terminal delivers the target virtual prop into the virtual environment based on the target delivery method and the target delivery point. For example, based on the delivery point selection operation, the target delivery point, and the target delivery method, when receiving a trigger operation for confirming a delivery control, the terminal delivers the target virtual prop. Alternatively, the target virtual prop corresponds to the needs to select n target delivery points. When the terminal receives an n-th delivery point selection operation, the terminal automatically delivers the target virtual prop according to the n target delivery points and a corresponding target delivery method, where n is a positive integer.

As shown in FIG. 3, the terminal delivers the target virtual prop into the virtual environment based on a target delivery method corresponding to the target delivery point 305*a*, so that the target virtual prop takes effect at the target delivery point 305*a*. Simultaneously, the terminal delivers the target virtual prop into the virtual environment based on a target delivery method corresponding to the target delivery point 305*b*, so that the target virtual prop takes effect at a delivery point 305*c*. There is a certain distance between the delivery point 305*c* and the target delivery point 305*b*, that is, there is a deviation in the delivery based on the target delivery point 305*b*.

In summary, in the embodiment of this disclosure, the target delivery method is determined based on the distance between the target delivery point and the first virtual object, so that the delivery precision of the target virtual prop changes with a change of the delivery distance. Compared with the single delivery method in the related art, delivery methods with different delivery precisions can be simulated based on the delivery distance, which can improve the diversity of the method for delivering the target virtual prop, increase the number of times of delivery of the target virtual prop per unit of time, that is, increase the number of times of human-computer interactions per unit of time, and improve the utilization rate of hardware resources of the terminal. In addition, delivery precisions corresponding to different delivery distances are different, which makes the delivery of the virtual prop more realistic and improves the authenticity of delivering the virtual prop in the virtual environment.

Figure 4:
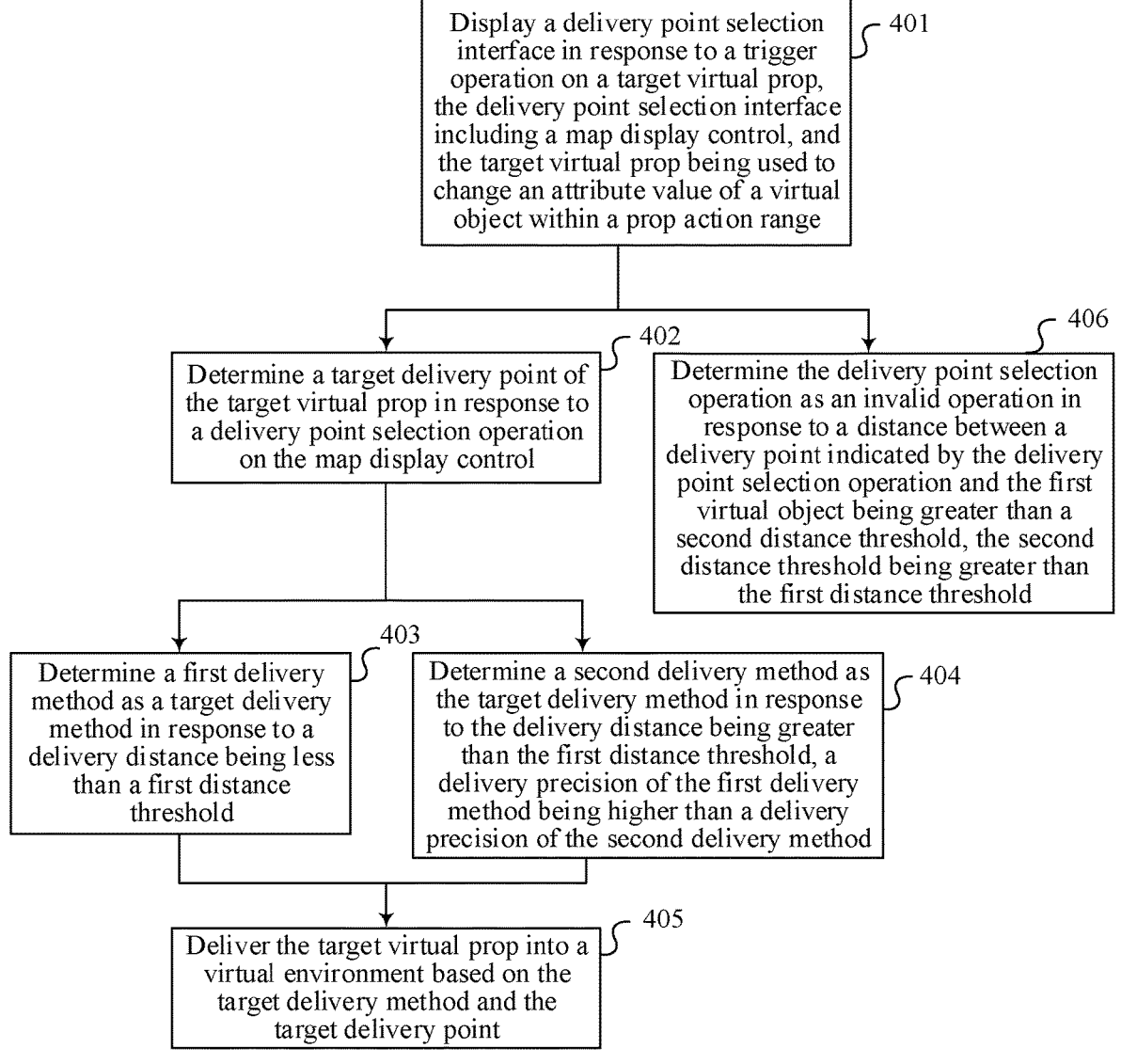
FIG. 4 is a schematic flowchart of a method for delivering a virtual prop according to an embodiment of this disclosure.

In some embodiments, the delivery methods in the embodiment of this disclosure include a first delivery method and a second delivery method. The first delivery method is a precise delivery in which the target delivery point is used as an actual delivery point, and the second delivery method is a range delivery in which a delivery range is determined based on the target delivery point and delivery distance. A delivery precision of the first delivery method is higher than that of the second delivery method. Refer to FIG. 4, which shows a flowchart of a method for delivering a virtual prop according to an embodiment of this disclosure. In this embodiment, a description is made using an example in which the method is used for the first terminal 110 or the second terminal 130 in the implementation environment shown in FIG. 1 or other terminals in the implementation environment, and the method includes the following steps.

Step 401: Display, by a terminal, a delivery point selection interface in response to a trigger operation on a target virtual prop, the delivery point selection interface including a map display control, and the target virtual prop being used to change an attribute value of a virtual object within a prop action range.

Step 402: Determine a target delivery point of the target virtual prop in response to a delivery point selection operation on the map display control.

For an exemplary implementation of the steps 401 and 402, reference may be made to the steps 201 and 202, and details are not described again in the embodiment of this disclosure.

Step 403: Determine a first delivery method as a target delivery method in response to a delivery distance being less than a first distance threshold.

In some embodiments, the first delivery method is a delivery method with the highest delivery precision, that is, a probability that the actual delivery point hits the target delivery point is the largest. When the delivery distance is close, the terminal determines the first delivery method as the target delivery method, so that it is convenient for the user to control the first virtual object to change an attribute value of a hostile virtual object at close range.

For example, if the first distance threshold is 50 m, the terminal determines the first delivery method as the target delivery method when the delivery distance between the target delivery point and the position of the first virtual object is less than or equal to 50 m.

In an example, the first delivery method is a precise delivery, and the terminal uses the target delivery point as the actual delivery point for delivery.

Step 404: Determine a second delivery method as the target delivery method in response to the delivery distance being greater than the first distance threshold, where a delivery precision of the first delivery method is higher than a delivery precision of the second delivery method.

In some embodiments, the delivery precision of the second delivery method is lower than that of the first delivery method, that is, a probability that the actual delivery point hits the target delivery point in the second delivery method is smaller than that in the first delivery method, thereby simulating a case that the farther a delivery distance is, the larger an offset is when an object is delivered, which improves the authenticity of delivering the target virtual prop in the virtual environment. When the delivery distance is far, the terminal determines the second delivery method as the target delivery method, so as to avoid always delivering the target virtual prop with a high delivery precision, so that a hit rate of the target virtual prop is too high. As a result, cases are caused such as: the user is more likely to operate in manners of remote attacks and evasion compared with a close combat, the utilization rate of other virtual props is reduced, and a game duration is prolonged.

In an example, the second delivery method is a range delivery, that is, the terminal does not directly determine the target delivery point as the actual delivery point, but determines a delivery range according to the target delivery point, and determines an actual delivery point from the delivery range (e.g., the terminal randomly determines a point from the delivery range as the actual delivery point).

Step 405: Deliver the target virtual prop into a virtual environment based on the target delivery method and the target delivery point.

Based on the target delivery point and the target delivery method corresponding to the target delivery point, the terminal determines the actual delivery point in the virtual environment, and delivers the target virtual prop. In some embodiments, the step 405 includes the following sub-steps.

Sub-step a: Determine the actual delivery point based on the target delivery method and the target delivery point.

The target delivery point is a position point selected by the user through the map display control to make the target virtual prop take effect. Since delivery precisions corresponding to different delivery methods are different, the actual delivery point may not necessarily be the target delivery point. In some embodiments, the sub-step a includes the following steps.

Step I: Determine the target delivery point as the actual delivery point in response to the target delivery method being the first delivery method.

The first delivery method is a delivery method in which the target delivery point selected by the user is the actual delivery point. Therefore, when the target delivery method is the first delivery method, the terminal determines the target delivery point as the actual delivery point.

Figure 5:
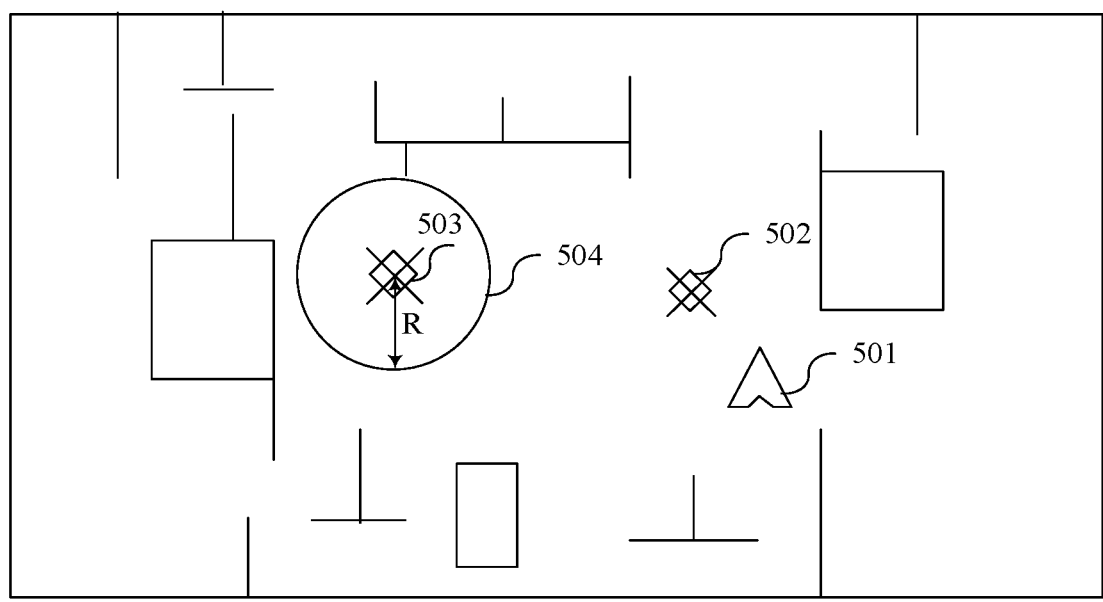
FIG. 5 is a schematic diagram of determining a target delivery point according to an embodiment of this disclosure.

As shown in FIG. 5, the terminal determines the target delivery point 502 and the target delivery point 503 based on the delivery point selection operation. A delivery distance between the target delivery point 502 and the first virtual object 501 is less than the first distance threshold, so a target delivery method corresponding to the target delivery point 502 is the first delivery method, and the terminal determines the target delivery point 502 as the actual delivery point.

Step II: Determine the actual delivery point based on the target delivery point and the delivery distance in response to the target delivery method being the second delivery method.

In some embodiments, when the target delivery method is the second delivery method, the selection of the actual delivery point is related to the delivery distance. The farther the delivery distance, the smaller the probability that the actual delivery point hits the target delivery point. The step II further includes the following steps.

Step 1: Determine a delivery region based on the target delivery point and the delivery distance, the delivery region being centered on the target delivery point, and a range of the delivery region being positively correlated with the delivery distance.

The delivery precision of the second delivery method is low, but the actual delivery point cannot be arbitrarily determined, and still needs to be determined based on the target delivery point. In some embodiments, the terminal determines the delivery region based on the target delivery point and the delivery distance, so that the actual delivery point is determined in the delivery region, and a size of the delivery region increases as the delivery distance increases.

Exemplarily, the delivery region is a circular region with the target delivery point as a circle center, and a calculation formula of its radius is $(x-50)/100*S$, where x is the delivery distance, S is a zoom value, and the greater the delivery distance, the greater the radius of the delivery region.

As shown in FIG. 5, the delivery distance between the target delivery point 503 and the first virtual object 501 is greater than the first distance threshold, so a target delivery method corresponding to the target delivery point 503 is the second delivery method, and the terminal determines a radius R of the delivery region based on a target delivery distance, so that the delivery range is determined with the target delivery point 503 as the center and with R as the radius.

Step 2: Determine the actual delivery point from the delivery region.

In some embodiments, the terminal randomly determines a point from the delivery region as the actual delivery point, or determines a point on an edge of the delivery region as the actual delivery point, which is not limited in the embodiment of this disclosure.

Sub-step b: Deliver the target virtual prop to the actual delivery point in the virtual environment.

After determining the actual delivery point, the terminal delivers the target virtual prop to the actual delivery point in the virtual environment, so that the target virtual prop takes effect at the actual delivery point.

Step 406: Determine the delivery point selection operation as an invalid operation in response to a distance between a delivery point indicated by the delivery point selection operation and the first virtual object being greater than a second distance threshold, the second distance threshold being greater than the first distance threshold.

Usually the target virtual prop has a certain range, so the first virtual object cannot deliver the target virtual prop to an arbitrary position in the virtual environment. When the distance between the delivery point indicated by the delivery point selection operation and the first virtual object is greater than the second distance threshold, the target virtual prop cannot be delivered.

In some embodiments, when the distance between the delivery point indicated by the delivery point selection operation and the first virtual object is greater than the second distance threshold, the terminal displays a prompt message to prompt the user that the delivery cannot be performed there. Alternatively, when the distance between the delivery point indicated by the delivery point selection operation and the first virtual object is less than the second distance threshold, the terminal uses a special mark to display a position of the target delivery point in the map display control, and when the distance between the delivery point indicated by the delivery point selection operation and the first virtual object is greater than the second distance threshold, the terminal does not make any response.

In an example, the first distance threshold is 50 m, and the second distance threshold is 500 m. That is, the terminal determines the first delivery method as a target delivery method corresponding to a target delivery point with a delivery distance less than 50 m, and determines the second delivery method as a target delivery method corresponding to a target delivery point with a delivery distance less than 500 m and greater than 50 m. When the distance between the delivery point indicated by the delivery point selection operation and the first virtual object is greater than 500 m, the delivery point selection operation is determined to be an invalid operation.

In the embodiment of this disclosure, when the delivery distance is less than the first distance threshold, the target delivery point is used as the actual delivery point for delivery. When the delivery distance is greater than the first distance threshold, the delivery region is determined based on the target delivery point, and the actual delivery point is determined from the delivery region for delivery. The delivery region increases with the increase of the delivery distance, that is, the greater the delivery distance, the lower the delivery precision of the target virtual prop. The diversity of the delivery method is improved, so that the number of times of delivery of the target virtual prop per unit of time can be increased, that is, the number of times of human-computer interactions per unit of time can be increased, and the utilization rate of hardware resources of the terminal can be improved. In addition, the delivery precision can be determined based on the delivery distance, which can improve the rationality and authenticity of delivering the target virtual prop.

In some embodiments, the user may select a plurality of target delivery points through the map display control. The terminal determines the target delivery method based on the delivery distance of each target delivery point, and then determines a prop delivery quantity based on the target delivery method, so as to deliver the target virtual prop in a dispersion manner. Refer to FIG. 6, which shows a flowchart of a method for delivering a virtual prop according to an embodiment of this disclosure. In this embodiment, a description is made using an example in which the method is used for the first terminal 110 or the second terminal 130 in the implementation environment shown in FIG. 1 or other terminals in the implementation environment, and the method includes the following steps.

Step 601: Determine, by the terminal, the delivery point selection region from the virtual environment, in response to the trigger operation on the target virtual prop, based on the position of the first virtual object.

In some embodiments, the target virtual prop corresponds to a delivery point selection region, and the terminal needs to determine the delivery point selection region based on the position of the first virtual object when the target virtual prop is triggered. For example, the delivery point selection region is a circular, rectangular, or irregular-shaped region centered on the position of the first virtual object, or the delivery point selection region is a region directly in front of the first virtual object, which is not limited in the embodiment of this disclosure.

Step 602: Display a map screen of the delivery point selection region in the map display control of the delivery point selection interface.

The terminal displays the map screen of the delivery point selection region through the map display control, so that the user may select the target delivery point from the map display control by observing the map screen. In some embodiments, a virtual environment range corresponding to the map screen displayed in the map display control is consistent with the delivery point selection region, or, the virtual environment range corresponding to the map screen displayed in the map display control is greater than the delivery point selection region and includes the delivery point selection region.

Step 603: Display a position of a second virtual object in the delivery point selection region through the map screen within a predetermined duration, the second virtual object and the first virtual object belonging to different camps.

In order to facilitate the user to select an appropriate target delivery point, the terminal displays the position of the second virtual object through the map screen, so that the user may select the target delivery point based on the position of the second virtual object. In some embodiments, the terminal only displays the position of the second virtual object within the predetermined duration, and the position is a position of the second virtual object in the virtual environment when the terminal receives the trigger operation on the target virtual prop. The position displayed on the map screen does not change with the movement of the second virtual object.

Figure 7:
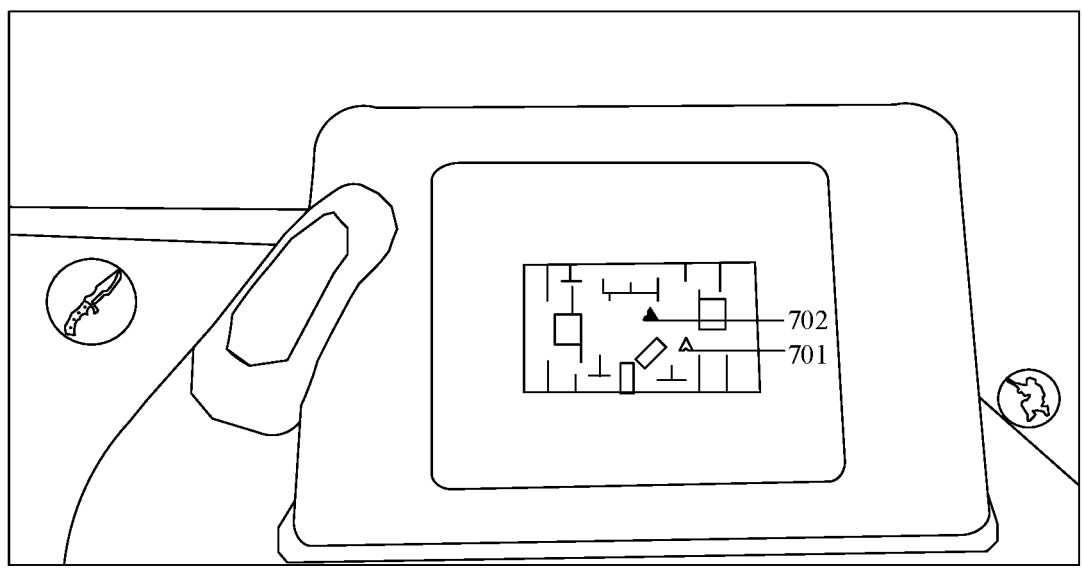
FIG. 7 is a schematic diagram of displaying a map display control according to an embodiment of this disclosure.

As shown in FIG. 7, the terminal displays a position of a first virtual object 701, and a position of a second virtual object 702 in the delivery point selection region through the map screen in the map display control. After receiving the trigger operation on the target virtual prop, the terminal displays the map display control, displays a scan cursor on the map screen in a moving manner according to a preset direction (e.g., from left to right), and displays the position of the second virtual object in a map screen region scanned by the scan cursor. When a display duration of the map screen reaches the preset duration, the display of the position of the second virtual object is canceled, thereby prompting the user to quickly select the target delivery point based on the position of the second virtual object, which avoids the movement of the second virtual object to other positions due to excessively long observation time, and avoids the waste of the target virtual prop.

Step 604: Display a prompt message in response to the number of times of receiving the delivery point selection operation being greater than n, the prompt message being used to indicate that the delivery point setting reaches an upper limit, and n being a positive integer; or determine delivery points indicated by the last n delivery point selection operations as the target delivery point, in response to the number of times of receiving the delivery point selection operation being greater than n.

In some embodiments, the terminal may simultaneously deliver the target virtual props to a plurality of delivery points. For example, the target virtual prop is a bunch of missiles, and the user may select a plurality of target delivery points, so that the terminal delivers the target virtual props to the actual delivery point corresponding to each target delivery point in a dispersion manner.

In some embodiments, an upper limit of the delivery points for the terminal to deliver the target virtual props once is n, that is, the user may only simultaneously select n target delivery points. When the number of times of receiving the delivery point selection operation by the terminal is greater than n, the target delivery point is updated based on the last n operations, or the user is prompted that the delivery point setting reaches the upper limit, so that the user readjusts the target delivery point, for example, the user may delete the selected target delivery point by a delivery point deleting operation, and re-perform the delivery point selection operation. Alternatively, when the number of times of the delivery point selection operation reaches n, the terminal immediately delivers the target virtual prop based on the n target delivery points. This is not limited in the embodiment of this disclosure.

Step 605: Determine the target delivery method based on the delivery distance between the target delivery point and the position of the first virtual object, different delivery methods corresponding to different delivery precisions, and the first virtual object being a virtual object that delivers the target virtual prop.

For an exemplary implementation of step 605, reference may be made to step 203, and details are not described again in the embodiment of this disclosure.

Step 606: Determine a prop delivery quantity corresponding to each target delivery point in response to the existence of at least two target delivery points.

In some embodiments, the terminal delivers the target virtual props in an average manner, that is, the prop delivery quantity corresponding to each target delivery point is the same. In some embodiments, a total quantity of the target virtual props in a delivery process is constant, and the terminal determines the prop delivery quantity at each target delivery point based on the total quantity of the target virtual props and a quantity of the target delivery points, for example, the total quantity of the target virtual props is 3 missiles, and the quantity of the target delivery points is 3, then each target delivery point corresponds to 1 missile. Alternatively, the prop delivery quantity corresponding to each target delivery point is always the same, while the total quantity of the target virtual props delivered at one time may be different, for example, if a preset prop delivery quantity corresponding to the target delivery point is 2, then regardless of the quantity of the target delivery points, each target delivery point corresponds to 2 missiles.

In some embodiments, the total quantity of the target virtual props delivered at one time is constant, and the terminal determines the prop delivery quantity based on the target delivery method corresponding to the target delivery point. Step 606 further includes the following step:

determining the prop delivery quantity corresponding to each target delivery point, in response to the target delivery point corresponding to at least two target delivery methods, and based on the target delivery method corresponding to each target delivery point, the prop delivery quantity being negatively correlated with a delivery precision corresponding to the delivery method.

The terminal determines the prop delivery quantity corresponding to each target delivery point based on the target delivery method. The higher the delivery precision corresponding to the target delivery method, the less the prop delivery quantity. For example, the user needs to select 3 target delivery points. When the target delivery methods corresponding to the 3 target delivery points are the same, the prop delivery quantity corresponding to each target delivery point is the same. If a target delivery method corresponding to one target delivery point (delivery point a) is the first delivery method, and a target delivery method corresponding to two target delivery points (delivery point b and delivery point c) is the second delivery method, then a prop delivery quantity at the delivery point a is 50%, and both a prop delivery quantity corresponding to the delivery point b and a prop delivery quantity corresponding to the delivery point c are 25%.

Step 607: Deliver the target virtual prop into the virtual environment according to the target delivery method and the prop delivery quantity.

The terminal determines the actual delivery point according to the target delivery method corresponding to each target delivery point, and then delivers the target virtual props to the actual delivery points in a dispersion manner based on the prop delivery quantity.

Step 608: Generate m sub-virtual props based on the target virtual prop, in response to the target virtual prop taking effect, m being a positive integer.

In some embodiments, after a throwing virtual prop takes effect, prop fragments are generated, and the terminal uses the prop fragment as a sub-virtual prop, and controls the sub-virtual prop to perform a secondary delivery.

In some embodiments, a quantity of the sub-virtual props generated by the target virtual prop is a fixed quantity, that is, m is a fixed value. Alternatively, the terminal randomly determines a value of m within a certain range of values, that is, the quantity of the sub-virtual props generated every time the target virtual prop takes effect may be different. This is not limited in the embodiment of this disclosure.

Step 609: Control the m sub-virtual props to move along a preset trajectory.

In some embodiments, the terminal controls each of the m sub-virtual props to move along a corresponding preset trajectory. In some embodiments, the preset trajectory is a fixed trajectory, that is, the sub-virtual prop moves along the same trajectory every time the target virtual prop takes effect, or the terminal randomly determines m preset trajectories from the preset trajectories, so as to control the sub-virtual prop to move. Exemplarily, the preset trajectory is a parabola starting from the actual delivery point.

Step 610: Control the sub-virtual prop to take effect at a collision point, in response to the collision of the sub-virtual prop during a movement process, a prop action range of the sub-virtual prop being smaller than a prop action range of the target virtual prop.

The terminal controls the sub-virtual prop to move along the preset trajectory. If the sub-virtual prop collides during the movement process, for example, the sub-virtual prop collides with a virtual building, the second virtual object, the ground in the virtual environment, or the like, the terminal controls the sub-virtual prop to immediately take effect at the collision point. In some embodiments, the prop action range of the sub-virtual prop is smaller than the prop action range of the target virtual prop. For example, the action range of the target virtual prop is a spherical region with a radius of 20 m centered on the actual delivery point, when the target virtual prop takes effect, attribute values of the second virtual object in this region are changed, the sub-virtual prop generated after the action of the target virtual prop moves along the preset trajectory, and performs a secondary action after the collision, and the prop action range of the sub-virtual prop is a spherical region with a radius of 10 m centered on the collision point.

Figure 8:
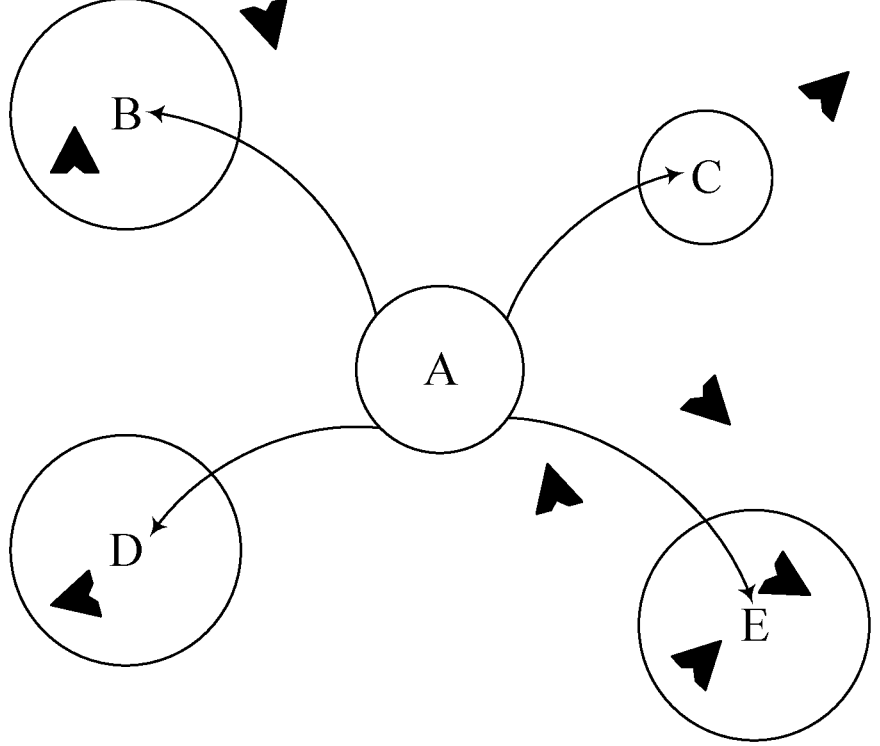
FIG. 8 is a schematic diagram of controlling a sub-virtual prop to move along a preset trajectory according to an embodiment of this disclosure.

In an example, the target virtual prop and the sub-virtual prop change the attribute value of the second virtual object in different degrees, and the degree of change of the attribute value by the sub-virtual prop is smaller than the degree of change of the attribute value by the target virtual prop. As shown in FIG. 8, after the target virtual prop takes effect at a point A, 4 sub-virtual props are generated. The terminal controls the sub-virtual props to move along 4 preset trajectories, and the sub-virtual props respectively collide at points B, C, D, and E. There is one second virtual object in both prop action ranges of the sub-virtual props corresponding to the points B and D, there are two second virtual objects in a prop action range of the sub-virtual prop corresponding to the point E, and there is no second virtual object in a prop action range of the sub-virtual prop corresponding to the point C.

As shown in FIG. 9, after the target virtual prop takes effect at an actual delivery point 901, the terminal displays special effects of the target virtual prop through a virtual environment screen, and a process of generating a sub-virtual prop 902. The terminal controls the sub-virtual prop 902 to move along a preset trajectory, and after a collision occurs at a collision point 903, the terminal controls the sub-virtual prop to take effect at the collision point 903.

In the embodiment of this disclosure, the position of the second virtual object is displayed through the map screen only within the predetermined duration, so as to prompt the user to quickly select the target delivery point based on the position of the second virtual object, which avoids the movement of the second virtual object to other positions due to excessively long observation time, and avoids the waste of the target virtual prop. When there are at least two target delivery points, based on the target delivery method corresponding to each target delivery point, the prop delivery quantity corresponding to each target delivery point is determined, and the target virtual props are delivered in a dispersion manner, which improves the utilization rate of the target virtual prop when compared with the delivery method with a single fixed delivery point in the related art. After the target virtual prop takes effect, the terminal controls generation of the sub-virtual prop and makes the sub-virtual prop take effect again, which resolves a problem that due to a time difference between the user selecting the target delivery point and the target virtual prop taking effect, the target virtual prop still cannot act on the second virtual object while the user delivers accurately.

Figure 10:
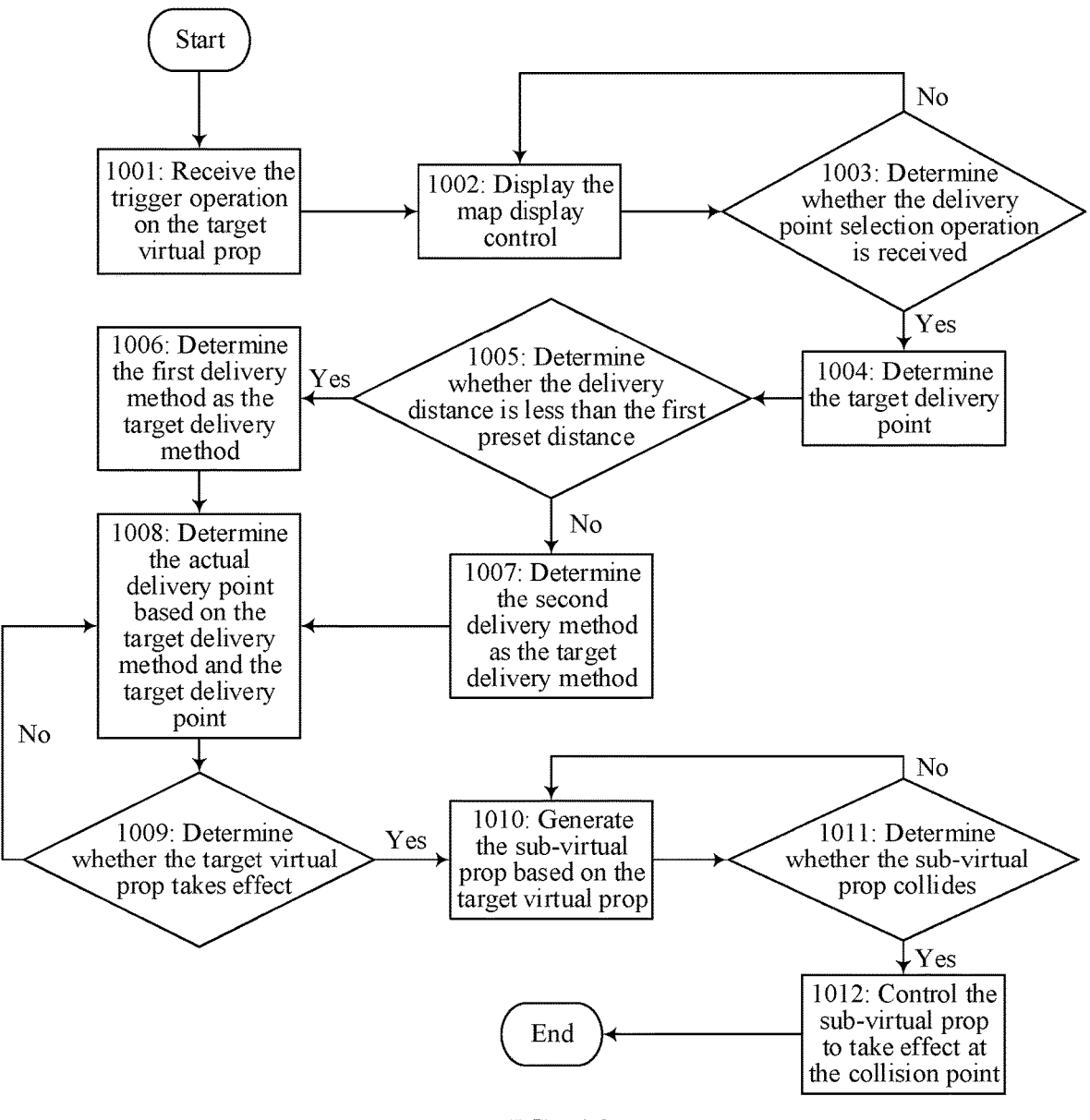
FIG. 10 is a schematic flowchart of a method for delivering a virtual prop according to an embodiment of this disclosure.

In an exemplary example, a delivery process of a virtual prop is shown as FIG. 10, including the following steps.

Step 1001: Receive, by the terminal, the trigger operation on the target virtual prop.

Step 1002: Display the map display control.

Step 1003: Determine whether the delivery point selection operation is received. If yes, step 1004 is executed, otherwise, the display of the map display control is continued.

Step 1004: Determine the target delivery point.

Step 1005: Determine whether the delivery distance is less than the first preset distance. If yes, step 1006 is executed, otherwise, step 1007 is executed.

Step 1006: Determine the first delivery method as the target delivery method.

Step 1007: Determine the second delivery method as the target delivery method.

Step 1008: Determine the actual delivery point based on the target delivery method and the target delivery point.

Step 1009: Determine whether the target virtual prop takes effect. If yes, step 1010 is executed, otherwise, the process returns to step 1008.

Step 1010: Generate the sub-virtual prop based on the target virtual prop.

Step 1011: Determine whether the sub-virtual prop collides. If yes, step 1012 is executed, otherwise, continue to control the sub-virtual prop to move.

Step 1012: Control the sub-virtual prop to take effect at the collision point.

Figure 11:
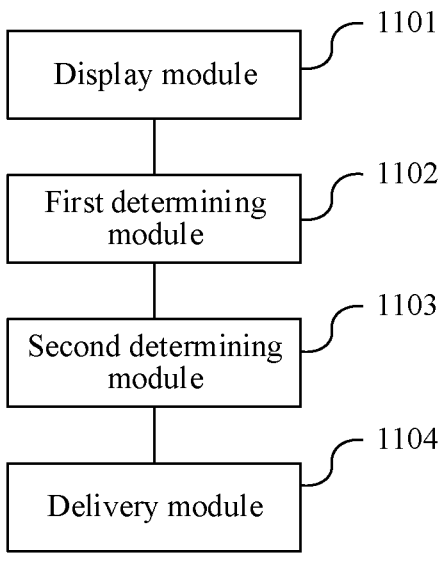
FIG. 11 is a structural block diagram of an apparatus for delivering a virtual prop according to an embodiment of this disclosure.

FIG. 11 is a structural block diagram of an apparatus for delivering a virtual prop according to an embodiment of this disclosure. The apparatus includes a display module 1101, a first determining module 1102, a second determining module 1103, and a delivery module 1104. One or more modules, submodules, and/or units of the apparatus can be implemented by processing circuitry, software, or a combination thereof, for example.

The display module 1101 is configured to display a delivery point selection interface in response to a trigger operation on a target virtual prop, the delivery point selection interface including a map display control, and the target virtual prop being used to change an attribute value of a virtual object within a prop action range.

The first determining module 1102 is configured to determine a target delivery point of the target virtual prop in response to a delivery point selection operation on the map display control. The second determining module 1103 is configured to determine the target delivery method based on the delivery distance between the target delivery point and the position of the first virtual object, different delivery methods corresponding to different delivery precisions, and the first virtual object being a virtual object that delivers the target virtual prop. The delivery module 1104 is configured to deliver the target virtual prop into a virtual environment based on the target delivery method and the target delivery point.

In some embodiments, the second determining module 1103 includes a first determining unit and a second determining unit. The first determining unit is configured to determine a first delivery method as the target delivery method in response to the delivery distance being less than a first distance threshold. The second determining unit is configured to determine a second delivery method as the target delivery method in response to the delivery distance being greater than the first distance threshold. A delivery precision of the first delivery method is higher than a delivery precision of the second delivery method.

In some embodiments, the delivery module 1104 includes a third determining unit and a first delivery unit. The third determining unit is configured to determine an actual delivery point based on the target delivery method and the target delivery point. The first delivery unit is configured to deliver the target virtual prop to the actual delivery point in the virtual environment.

In some embodiments, the third determining unit is further configured to determine the target delivery point as the actual delivery point in response to the target delivery method being the first delivery method; and determine the actual delivery point based on the target delivery point and the delivery distance in response to the target delivery method being the second delivery method.

In some embodiments, the third determining unit is further configured to determine a delivery region based on the target delivery point and the delivery distance, the delivery region being centered on the target delivery point, and a range of the delivery region being positively correlated with the delivery distance; and determine the actual delivery point from the delivery region.

In some embodiments, the apparatus further includes a third determining module, configured to determine the delivery point selection operation as an invalid operation in response to a distance between a delivery point indicated by the delivery point selection operation and the first virtual object being greater than a second distance threshold, the second distance threshold being greater than the first distance threshold.

In some embodiments, the display module 1101 includes a fourth determining unit, a first display unit, and a second display unit. The fourth determining unit is configured to determine a delivery point selection region from the virtual environment, in response to the trigger operation on the target virtual prop, based on the position of the first virtual object. The first display unit is configured to display a map screen of the delivery point selection region in a map display control of the delivery point selection interface. The second display unit is configured to display a position of a second virtual object in the delivery point selection region through the map screen within a predetermined duration, the second virtual object and the first virtual object belonging to different camps.

In some embodiments, the first determining module 1102 includes a third display unit, and/or a fifth determining unit. The third display unit is configured to display a prompt message in response to the number of times of receiving the delivery point selection operation being greater than n, the prompt message being used to indicate that the delivery point setting reaches an upper limit, and n being a positive integer. The fifth determining unit is configured to determine delivery points indicated by the last n delivery point selection operations as the target delivery point in response to the number of times of receiving the delivery point selection operation being greater than n, n being a positive integer.

In some embodiments, the delivery module 1104 includes a sixth determining unit and a second delivery unit. The sixth determining unit is configured to determine a prop delivery quantity corresponding to each of the target delivery points in response to the existence of at least two of the target delivery points. The second delivery unit is configured to deliver the target virtual prop into the virtual environment according to the target delivery method and the prop delivery quantity.

In some embodiments, the sixth determining unit is further configured to determine the prop delivery quantity corresponding to each of the target delivery points, in response to the target delivery point corresponding to at least two of the target delivery methods, based on the target delivery method corresponding to each of the target delivery points, the prop delivery quantity being negatively correlated with a delivery precision corresponding to the delivery method.

In some embodiments, the apparatus further includes a generation module, a first control module, and a second control module. The generation module is configured to generate m sub-virtual props based on the target virtual prop, in response to the target virtual prop taking effect, m being a positive integer. The first control module is configured to control the m sub-virtual props to move along a preset trajectory. The second control module is configured to control the sub-virtual prop to take effect at a collision point, in response to the collision of the sub-virtual prop during a movement process, a prop action range of the sub-virtual prop being smaller than the prop action range of the target virtual prop.

In summary, in the embodiment of this disclosure, the target delivery method is determined based on the distance between the target delivery point and the first virtual object, so that the delivery precision of the target virtual prop changes with a change of the delivery distance. Compared with the single delivery method in the related art, delivery methods with different delivery precisions can be simulated based on the delivery distance, which can improve the diversity of the method for delivering the target virtual prop, increase the number of times of delivery of the target virtual prop per unit of time, that is, increase the number of times of human-computer interactions per unit of time, and improve the utilization rate of hardware resources of the terminal. In addition, delivery precisions corresponding to different delivery distances are different, which can make the delivery of the virtual prop appear more realistic and improve the authenticity of delivering the virtual prop in the virtual environment.

Figure 12:
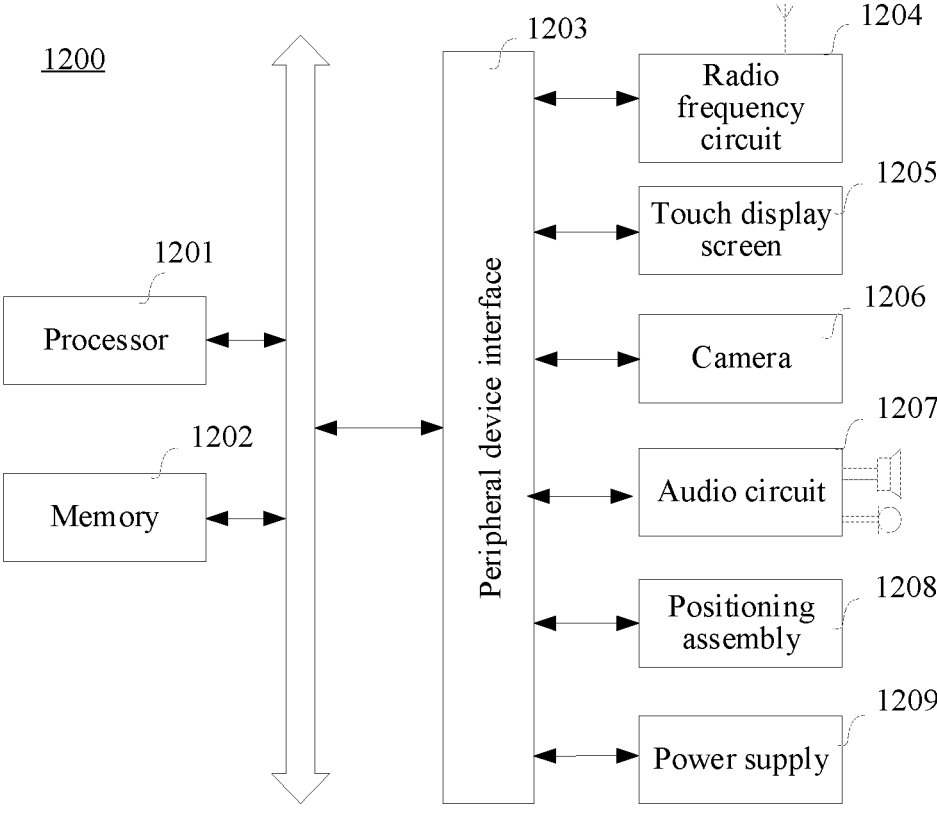
FIG. 12 is a structural block diagram of a terminal according to an embodiment of this disclosure.

Refer to FIG. 12, which shows a structural block diagram of a terminal 1200 according to an embodiment of this disclosure. The terminal 1200 may be a portable mobile terminal, such as a smart phone, a tablet computer, a moving picture experts group audio layer III (MP3) player, or a moving picture experts group audio layer IV (MP4) player. The terminal 1200 may be further referred to as other names such as user equipment and a portable terminal.

Generally, the terminal 1200 includes a processor 1201 and a memory 1202.

Processing circuitry, such as the processor 1201, may include one or more processing cores, for example, a 4-core processor or an 8-core processor. The processor 1201 may be implemented by using at least one hardware form of a digital signal processor (DSP), a field-programmable gate array (FPGA), and a programmable logic array (PLA). The processor 1201 may alternatively include a main processor and a coprocessor. The main processor is configured to process data in an active state, also referred to as a central processing unit (CPU). The coprocessor is a low-power processor configured to process data in a standby state. In some embodiments, the processor 1201 may be integrated with a graphics processing unit (GPU), which is responsible for rendering and drawing a content required to be displayed by a display screen. In some embodiments, the processor 1201 may further include an artificial intelligence (AI) processor, which is configured to process a machine learning related computing operation.

The memory 1202 may include one or more computer-readable storage media. The computer-readable storage medium may be tangible and non-transient. The memory 1202 may further include a high-speed random access memory, and a non-volatile memory such as one or more magnetic disk storage devices and a flash storage device. In some embodiments, the non-transitory computer-readable storage medium in the memory 1202 is configured to store at least one instruction, the at least one instruction being configured to be executed by the processor 1201 to implement the methods according to embodiments of this disclosure.

In some embodiments, the terminal 1200 may include a peripheral device interface 1203 and at least one peripheral device. The peripheral device includes at least one of a radio frequency circuit 1204, a touch display screen 1205, a camera 1206, an audio circuit 1207, a positioning assembly 1208, and a power supply 1209.

A person skilled in the art may understand that the structure shown in FIG. 12 is merely exemplary and is not a limitation on the terminal 1200, and the terminal may include more or fewer components than those shown in the figure, or some components may be combined, or a different component deployment may be used.

An embodiment of this disclosure further provides a computer-readable storage medium, storing at least one instruction, the at least one instruction being loaded and executed by a processor to implement the method for delivering a virtual prop according to the foregoing embodiments.

An embodiment of this disclosure further provides a computer program product or a computer program, the computer program product or the computer program including a computer instruction, and the computer instruction being stored in a computer-readable storage medium. A processor of a computer device reads the computer instruction from the computer-readable storage medium, and executes the computer instruction, to cause the computer device to perform the method for delivering a virtual prop according to the implementations in the foregoing aspect.

A person skilled in the art should be aware that in the one or more examples, the functions described in the embodiments of this disclosure may be implemented by using hardware, software, firmware, or any combination thereof. When implemented by using software, the functions can be stored in a computer-readable storage medium or can be used as one or more instructions or code in a computer-readable storage medium for transmission. The computer-readable storage medium includes a computer storage medium and a communication medium, where the communication medium includes any medium that enables a computer program to be transmitted from one place to another. The storage medium may be any available medium accessible to a general-purpose or dedicated computer.

The foregoing descriptions are merely exemplary embodiments of this disclosure, and are not intended to limit this disclosure. Any modification, equivalent replacement, or improvement made within the spirit and principle of this disclosure shall fall within the scope of this disclosure.

What is claimed is:

1. A method for delivering a virtual effect, the method comprising:

displaying a delivery point selection interface based on a user selection of a target virtual effect received from a user of a first virtual object, the target virtual effect being configured to change an attribute value of a second virtual object within an effect range of the target virtual effect;

determining a target delivery point of the target virtual effect based on a delivery point selection received from the user of the first virtual object via the delivery point selection interface;

determining, by processing circuitry, a target delivery mechanism is a first delivery mechanism based on a delivery distance between the target delivery point and a position of the first virtual object being less than a first distance threshold, the first delivery mechanism corresponding to a first delivery precision;

determining, by the processing circuitry, the target delivery mechanism is a second delivery mechanism based on the delivery distance being greater than or equal to the first distance threshold, the second delivery mechanism corresponding to a second delivery precision lower than the first delivery precision;

determining, by the processing circuitry, an actual delivery point of the target virtual effect based on the target delivery point and which one of the first delivery precision and the second delivery precision corresponds to the target delivery mechanism;

determining, by the processing circuitry, an effect delivery quantity based on the target delivery mechanism, the effect delivery quantity being negatively correlated with the one of the first delivery precision and the second delivery precision corresponding to the target delivery mechanism; and controlling delivery of the target virtual effect in a virtual environment based on the target delivery mechanism, the actual delivery point, and the effect delivery quantity.

2. The method according to claim 1, wherein the controlling the delivery includes controlling the first virtual object to deliver the target virtual effect to the actual delivery point in the virtual environment, and the target virtual effect is generated by a target virtual prop.

3. The method according to claim 1, wherein the determining the actual delivery point includes:

determining the target delivery point as the actual delivery point based on the target delivery mechanism being the first delivery mechanism corresponding to the first delivery precision; and based on the target delivery mechanism being the second delivery mechanism corresponding to the second delivery precision, determining the actual delivery point based on the target delivery point and the delivery distance.

4. The method according to claim 3, wherein the determining the actual delivery point based on the target delivery point and the delivery distance comprises:

determining a delivery region based on the target delivery point and the delivery distance, the delivery region being centered on the target delivery point, and a range of the delivery region being positively correlated with the delivery distance; and determining the actual delivery point based on the delivery region.

5. The method according to claim 1, further comprising:

determining the delivery point selection as invalid based on a distance between a delivery point indicated by the delivery point selection and the first virtual object being greater than a second distance threshold, the second distance threshold being greater than the first distance threshold.

6. The method according to claim 1, wherein the displaying the delivery point selection interface comprises:

determining a delivery point selection region in the virtual environment based on the position of the first virtual object;

displaying a map screen of the delivery point selection region in a map display control of the delivery point selection interface; and displaying, in the delivery point selection region through the map screen for a predetermined duration, a position of the second virtual object at a moment that the user selection of the target virtual effect is received, without display of any indication of movement of the second virtual object after the moment.

7. The method according to claim 1, further comprising:

displaying a prompt message in response to a number of times of the delivery point selection is received being greater than n, the prompt message indicating that a maximum number of delivery points is reached, n being a positive integer; or determining a plurality of target delivery points indicated by last n delivery point selections based on the number of times the delivery point selection is received being greater than n.

8. The method according to claim 1, further comprising:

determining one or more other target delivery points of the target virtual effect and corresponding one or more other delivery precisions based on one or more other delivery point selections;

determining one or more other actual delivery points of the target virtual effect based on the one or more other target delivery points and the one or more other delivery precisions;

determining one or more other effect delivery quantities corresponding to the one or more other target delivery points; and controlling the first virtual object to deliver the target virtual effect to the one or more actual delivery points in the virtual environment based on the one or more other effect delivery quantities.

9. The method according to claim 1, further comprising:

generating a sub-virtual effect after the delivery of the target virtual effect in the virtual environment; and controlling delivery of the sub-virtual effect in the virtual environment based on a preset trajectory, wherein the sub-virtual effect is delivered at a collision point along the preset trajectory, an effect range of the sub-virtual effect being smaller than the effect range of the target virtual effect.

10. An apparatus, comprising:

processing circuitry configured to:

display a delivery point selection interface based on a user selection of a target virtual effect received from a user of a first virtual object, the target virtual effect being configured to change an attribute value of a second virtual object within an effect range of the target virtual effect;

determine a target delivery point of the target virtual effect based on a delivery point selection received from the user of the first virtual object via the delivery point selection interface;

determine a target delivery mechanism is a first delivery mechanism based on a delivery distance between the target delivery point and a position of the first virtual object being less than a first distance threshold, the first delivery mechanism corresponding to a first delivery precision;

determine the target delivery mechanism is a second delivery mechanism based on the delivery distance being greater than or equal to the first distance threshold, the second delivery mechanism corresponding to a second delivery precision lower than the first delivery precision;

determine an actual delivery point of the target virtual effect based on the target delivery point and which one of the first delivery precision and the second delivery precision corresponds to the target delivery mechanism;

determine an effect delivery quantity based on the target delivery mechanism, the effect delivery quantity being negatively correlated with the one of the first delivery precision and the second delivery precision corresponding to the target delivery mechanism; and control delivery of the target virtual effect in a virtual environment based on the target delivery mechanism, the actual delivery point, and the effect delivery quantity.

11. The apparatus according to claim 10, wherein the processing circuitry is configured to control the first virtual object to deliver the target virtual effect to the actual delivery point in the virtual environment, and the target virtual effect is generated by a target virtual prop.

12. The apparatus according to claim 10, wherein the processing circuitry is configured to:

determine the target delivery point as the actual delivery point based on the target delivery mechanism being the first delivery mechanism corresponding to the first delivery precision; and based on the target delivery mechanism being the second delivery mechanism corresponding to the second delivery precision, determine the actual delivery point based on the target delivery point and the delivery distance.

13. The apparatus according to claim 12, wherein the processing circuitry is configured to:

determine a delivery region based on the target delivery point and the delivery distance, the delivery region being centered on the target delivery point, and a range of the delivery region being positively correlated with the delivery distance; and determine the actual delivery point based on the delivery region.

14. The apparatus according to claim 10, wherein the processing circuitry is configured to:

determine the delivery point selection as invalid based on a distance between a delivery point indicated by the delivery point selection and the first virtual object being greater than a second distance threshold, the second distance threshold being greater than the first distance threshold.

15. The apparatus according to claim 10, wherein the processing circuitry is configured to:

determine a delivery point selection region in the virtual environment based on the position of the first virtual object;

display a map screen of the delivery point selection region in a map display control of the delivery point selection interface; and display, in the delivery point selection region through the map screen for a predetermined duration, a position of the second virtual object at a moment that the user selection of the target virtual effect is received, without display of any indication of movement of the second virtual object after the moment.

16. The apparatus according to claim 10, wherein the processing circuitry is configured to:

generate a sub-virtual effect after the delivery of the target virtual effect in the virtual environment; and control delivery of the sub-virtual effect in the virtual environment based on a preset trajectory, wherein the sub-virtual effect is delivered at a collision point along the preset trajectory, an effect range of the sub-virtual effect being smaller than the effect range of the target virtual effect.

17. A non-transitory computer-readable storage medium, storing instructions which when executed by a processor cause the processor to perform:

displaying a delivery point selection interface based on a user selection of a target virtual effect received from a user of a first virtual object, the target virtual effect being configured to change an attribute value of a second virtual object within an effect range of the target virtual effect;

determining a target delivery point of the target virtual effect based on a delivery point selection received from the user of the first virtual object via the delivery point selection interface;

determining a target delivery mechanism is a first delivery mechanism based on a delivery distance between the target delivery point and a position of the first virtual object being less than a first distance threshold, the first delivery mechanism corresponding to a first delivery precision;

determining the target delivery mechanism is a second delivery mechanism based on the delivery distance being greater than or equal to the first distance threshold, the second delivery mechanism corresponding to a second delivery precision lower than the first delivery precision;

determining an actual delivery point of the target virtual effect based on the target delivery point and which one of the first delivery precision and the second delivery precision corresponds to the target delivery mechanism;

determining an effect delivery quantity based on the target delivery mechanism, the effect delivery quantity being negatively correlated with the one of the first delivery precision and the second delivery precision corresponding to the target delivery mechanism; and controlling delivery of the target virtual effect in a virtual environment based on the target delivery mechanism, the actual delivery point, and the effect delivery quantity.

18. The non-transitory computer-readable storage medium according to claim 17, wherein the determining the actual delivery point includes:

determining the target delivery point as the actual delivery point based on the target delivery mechanism being the first delivery mechanism corresponding to the first delivery precision; and based on the target delivery mechanism being the second delivery mechanism corresponding to the second delivery precision, determining the actual delivery point based on the target delivery point and the delivery distance.

19. The non-transitory computer-readable storage medium according to claim 18, wherein the determining the actual delivery point based on the target delivery point and the delivery distance comprises:

determining a delivery region based on the target delivery point and the delivery distance, the delivery region being centered on the target delivery point, and a range of the delivery region being positively correlated with the delivery distance; and determining the actual delivery point based on the delivery region.

20. The non-transitory computer-readable storage medium according to claim 17, wherein the displaying the delivery point selection interface comprises:

determining a delivery point selection region in the virtual environment based on the position of the first virtual object;

displaying a map screen of the delivery point selection region in a map display control of the delivery point selection interface; and displaying, in the delivery point selection region through the map screen for a predetermined duration, a position of the second virtual object at a moment that the user selection of the target virtual effect is received, without display of any indication of movement of the second virtual object after the moment.

* * * * *